July 23, 1968  KARL-AXEL G. GUSTAVSSON  3,393,801
METHOD AND APPARATUS FOR FRACTIONATING
PARTICULATE MATERIALS
Filed Nov. 22, 1965
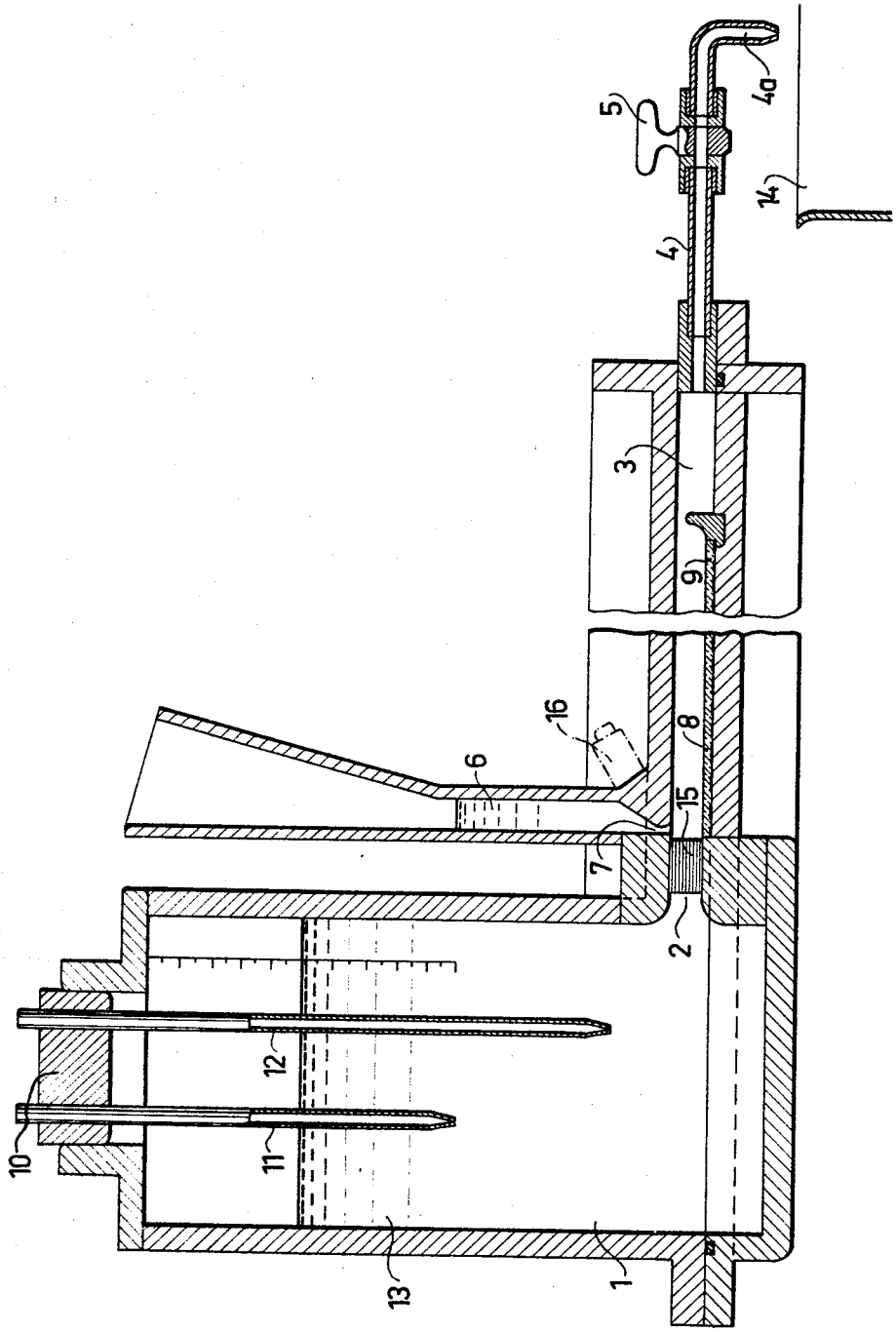
INVENTOR
Karl-Axel Goran Gustavsson
BY
Stevens, Davis, Miller & Mosher
ATTORNEYS

United States Patent Office 3,393,801
Patented July 23, 1968

3,393,801
METHOD AND APPARATUS FOR FRACTIONATING PARTICULATE MATERIALS
Karl-Axel Göran Gustavsson, Enkoping, Sweden, assignor to Aktiebolaget Bahco, Stockholm, Sweden, a Swedish corporation
Filed Nov. 22, 1965, Ser. No. 509,091
Claims priority, application Sweden, Nov. 26, 1964, 14,313/64
7 Claims. (Cl. 209—156)

ABSTRACT OF THE DISCLOSURE

A particulate material is fractionated to determine its particle size distribution by flowing a liquid through a horizontal passage in a substantially constant and laminar flow, introducing the material to be fractionated into the upper portion of the liquid stream so that particles of different sizes are carried different distances in the direction of flow, collecting the fractionated particles, and thereafter determining the relative amounts of the separated fractions.

---

The present invention relates to a method and an apparatus for fractionating a particulate material in a liquid to determine the particle size distribution of the particulate material.

Several methods of determining the particle size distribution in a material by settling of the material in a liquid are known. These methods in general comprise the step of periodically measuring the amount of remaining material or the amount of precipitated particulate material in a suspension to obtain a percentage mass distribution as a function of the settling time, the rate of settling or the particle size calculated therefrom. When these methods are used, the greatest uncertainty is associated with the difficulty of providing a complete dispersion of the particulate material in the liquid, so that the particles settle as individual particles and not wholly or partly as agglomerates. Many methods of improving the dispersion are known, such as agitation, vibration, ultrasonic treatment, boiling etc. of the suspension. A considerable number of additives to the suspension in microquantities are also suggested in the literature, such as sodium pyrophosphate, detergents, wetting agents etc., and it has been shown that the choice of settling liquid and additive is of great importance for improving the degree of dispersion. Relative improvements are easily ascertainable since the settling results indicates a finer dust the better the dispersion is.

In the known methods, however, it does not appear possible to measure or to decide whether the dispersion is complete or not, and this is necessary to evaluate the reliability of the analysis.

When settling a particulate material in a quiescent liquid column, fractions are not obtained; instead, one will always have a precipitated quantity of mixed particle sizes and a remaining quantity in the whole liquid column or a secton thereof, also comprising mixed particle sizes. Thus, the sharpness of separation cannot be tested by direct observation.

In accordance with the present invention, it is suggested that settling is to be carried out in a flowing liquid starting from the same height and longitudinal position for all partcles, which drop toward a flow bottom so that particles of different settling time (settling speed) will be carried by the liquid flow over different distances from the starting position depending on the settling time through the flowing liquid layer to be deposited on the bottom at different distances from the starting position. By collecting the settled particulate material on separate areas of the flow bottom having different average distances from the starting position, the mass of the fractions of the materials may be determined gravimetrically or otherwise. Also, it will be possible by direct observation in a microscope to evaluate and measure the quality of the fractions and the limit and average values of the particle sizes. Thus, it will be possible to check whether the dispersion was complete and the particle sizes agree with the theoretically calculated sizes.

To carry out a rigorous fractionation by the principle above set forth, the following conditions have to be met: (1) The particulate material is to be dispersed completely in the liquid with or without additives of the type referred to, depending on the nature of the particulate material. (2) The particles are to be introduced into the flowing liquid at one line extending normal to the direction of flow and to the vertical in the flowing liquid. (3) The particles are to be introduced so as not to disturb or change the flow. (4) The liquid flow is to be laminar, homogeneous, stationary and sufficiently slow to ensure that the smallest particle to be investigated will have time to settle in the field of flow. (5) The velocity of flow shall be controllable with a satisfactory accuracy.

In accordance with the above, the present invention relates to a method of fractionating a particulate material by settling in a liquid, in which substantially all the particles of the particulate material are caused to settle from the same height and longitudinal position within a liquid stream having a predominantly horizontal flow resultant and having a stationary, uniform and substantially laminar flow and collecting the particles on the bottom of the flow passage at different distances from the starting position.

The invention also includes an apparatus for carrying out said method, said apparatus comprising a substantially horizontal elongate passage having liquid inlet and liquid outlet at opposite ends, a liquid container communicating with said liquid inlet to introduce liquid into the passage to provide a liquid stream having a stationary, uniform and laminar flow through the passage, means communicating with an inlet at the upper side of the flow passage to introduce a suspension of particulate material into the flowing liquid so that all particles drop from the same height and longitudinal position into the liquid stream, and means provided on the bottom of the passage for collecting particle fractions at different longitudinal distances from the particle inlet.

The invention will be explained more in detail with reference to the accompanying drawing which illustrates an apparatus according to the invention in longitudinal cross-section.

The apparatus includes a liquid container 1 having a lower outlet in the form of an orifice 2 communicating with an elongate settling passage means 3. To the opposite end thereof, an outlet tube is connected having a shut-off valve 5 and an outlet capillary 4a. Provided adjacent the inlet end of the passage means 3 is a suspension receptacle or chamber 6 which at its top is open to the atmosphere and at its bottom communicates with the passage 3 through a narrow slot 7. On the bottom of the settling passage, there are arranged a number of detachable sheets of which the first and the last, designated 8, 9 are partly visible in the drawing. Their lengths in the direction of flow are selected so that desired fractions can be collected.

The liquid container 1 is closed hermetically by a plug 10. Two capillaries 11 and 12 extends through the plug 10 to different levels within the liquid 13. The higher capillary 11 serves to control the flow of liquid from the container 1 through the passage 3 by maintaining a constant liquid head between the lower orifice of the capillary 11 and the orifice of the outlet capillary 4a to ensure a constant velocity of flow in the settling passage 3. The liquid level in the chamber 6 is equal to the level of the orifice of the capillary 11 on account of the equal atmospheric pressure, as shown on the drawing.

If the capillary tube 11 is closed, the liquid level in the chamber 6 will instead be determined by the level of the lower opening of the capillary 12, i.e., the liquid level in the chamber 6 drops.

To introduce a liquid suspension which is to be fractionated in the apparatus, the liquid level in the chamber 6 will be lowered in the manner just described. Thereupon, the suspension is introduced into the chamber 6 in a volume equal to the volume of the chamber 6 between the levels of the points of the capillaries 11 and 12, and the capillary 11 is simultaneously opened. Thus, the suspension volume has been supplied to the system without any flow of liquid through the slot 7 in either direction, and the constant flow of liquid from the container 1 through the passage 3 will continue as long as the valve 5 is open until the liquid level in the container 1 reaches the point of the capillary 11.

The particulate material suspended in the suspension thus introduced will pass through the slot 7 into the passage 3. Particules of any given size will enter the passage at different times, but all particles will start their downward movement in the liquid stream at the same horizontal line with a range of tolerance determined by the width of the slot 7 as compared to the length of horizontal movement in the passage. Hence, each particle will be deposited on the passage bottom at a distance from the slot which depends on the velocity of flow of the liquid, the settling velocity of the particle and the height of the settling passage. All particles of the same settling velocity (size) will be deposited at the same distance from the slot.

After the settling is completed and all particles supplied with suspension have been deposited apart from any fine particles which settle too slowly to be deposited within the passage, the remaining liquid is cautiously removed from the system. The dust deposited on the sheets, such as 8, 9 is weighed and examined microscopically. If desired, the amount of fines remaining in the liquid can be determined by collecting the liquid in a vessel 14 and weighing the fine material after evaporation or filtration.

The sheets 8, 9 disposed on the bottom of the passage 3, which may suitably be glass sheets, may be removed e.g., by making the apparatus divided in the bottom plane of the passage 3, as shown on the drawing, whereby the entire top portion can be lifted off.

To ensure a laminar flow in the passage 3, it is suitable to position guiding members 15 in the opening 2. In order to prevent agglomeration of the particles passing through the slot 7, it may in some cases be desirable to provide an ultrasound transmitter 16 close to the slot.

I claim:

1. A method of fractionating a particulate material to determine its particle size distribution by settling in a liquid, comprising the steps of supplying a liquid stream to a substantially horizontal passage from a close liquid container having a capillary tube immersed in the liquid within said container, flowing said liquid through said passage in a substantially laminar flow and at substantially constant velocity, introducing particulate material into the flowing liquid at substantially a common point within the liquid stream, fractionating the particulate material within the liquid stream to cause particles of different sizes to accompany the flowing liquid for different distances in the direction of flow, and collecting the fractionated particles of different sizes on the bottom of said passage.

2. A method according to claim 1, further comprising supplying the particulate material in the form of a suspension by gravity feed from a supply chamber in which the liquid level is normally at the same height as the lower end of the capillary tube in the liquid container.

3. An apparatus for fractionating a particulate material, comprising means defining a substantially horizontal elongated liquid passage having a liquid inlet and a liquid outlet at opposite ends thereof, an enclosed liquid container communicating with said liquid inlet, a capillary tube extending into said liquid container and having a lower end immersed in liquid within said liquid container, means to introduce liquid from said liquid container through said liquid inlet into said passage to provide a liquid stream of substantially constant and laminar flow, a receptacle for a suspension of particulate material discharge means connecting said receptacle to the top of said passage close to said liquid inlet to enable substantially all of the particles of the particulate material to enter the liquid stream at the same height and longitudinal position, and means on the bottom of said passage for collecting particle fractions at different longitudinal distances along the length of said passage.

4. An apparatus according to claim 3, wherein the liquid outlet of said passage is a capillary tube.

5. An apparatus according to claim 3, further comprising a second capillary tube positioned in said liquid container and having a lower end at a lower level than the lower end of the first capillary tube.

6. An apparatus according to claim 3, wherein said receptacle for a suspension of particulate material is open to the atmosphere, and said discharge means connected to said receptacle comprises a narrow slot.

7. An apparatus according to claim 3, wherein said means defining a substantially horizontal elongated liquid passage includes a readily removable top portion.

References Cited

UNITED STATES PATENTS

| | | | |
|---|---|---|---|
| 128,404 | 6/1872 | Lathrop | 209—156 |
| 1,186,677 | 6/1916 | Parker | 209—156 |
| 1,521,787 | 1/1925 | Nesbitt | 209—156 |
| 1,709,365 | 4/1929 | Newsom | 209—156 |
| 2,932,394 | 4/1960 | McGinn | 209—135 |
| 3,144,773 | 8/1964 | Bramel | 73—61 X |

FOREIGN PATENTS

| | | |
|---|---|---|
| 326,471 | 4/1903 | France. |
| 386,997 | 12/1923 | Germany. |

HARRY B. THORNTON, *Primary Examiner.*

T. R. MILES, *Assistant Examiner.*